(12) United States Patent
Shin et al.

(10) Patent No.: US 9,414,359 B2
(45) Date of Patent: Aug. 9, 2016

(54) APPARATUS AND METHOD FOR RECEIVING MULTIPLE FREQUENCY ALLOCATIONS (FAS) IN A MOBILE COMMUNICATION SYSTEM

(75) Inventors: Yong-Won Shin, Suwon-si (KR); Jong-Han Lim, Seoul (KR); In-Hyoung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 457 days.

(21) Appl. No.: 13/390,171

(22) PCT Filed: Aug. 10, 2010

(86) PCT No.: PCT/KR2010/005226
§ 371 (c)(1),
(2), (4) Date: Mar. 5, 2012

(87) PCT Pub. No.: WO2011/019182
PCT Pub. Date: Feb. 17, 2011

(65) Prior Publication Data
US 2012/0230213 A1    Sep. 13, 2012

(30) Foreign Application Priority Data

Aug. 11, 2009  (KR) ..................... 10-2009-0073613

(51) Int. Cl.
| | |
|---|---|
| *H04W 4/00* | (2009.01) |
| *H04W 72/02* | (2009.01) |
| *H04L 5/00* | (2006.01) |
| *H04W 24/10* | (2009.01) |
| *H04W 72/00* | (2009.01) |
| *H04W 72/04* | (2009.01) |
| *H04W 88/06* | (2009.01) |

(52) U.S. Cl.
CPC ............. *H04W 72/02* (2013.01); *H04L 5/001* (2013.01); *H04L 5/0042* (2013.01); *H04L 5/0064* (2013.01); *H04W 24/10* (2013.01); *H04W 72/00* (2013.01); *H04W 72/042* (2013.01); *H04W 72/0453* (2013.01); *H04W 88/06* (2013.01)

(58) Field of Classification Search
USPC ........................ 370/329, 330, 338, 328, 331; 455/435.2, 552.1
See application file for complete search history.

(56) References Cited

U.S. PATENT DOCUMENTS

| | | | |
|---|---|---|---|
| 8,085,721 B2 * | 12/2011 | Ylitalo ........................ 370/329 |
| 2003/0219035 A1 * | 11/2003 | Schmidt ...................... 370/478 |
| 2008/0013654 A1 * | 1/2008 | Rick .................... H03G 3/3068 375/345 |
| 2008/0014892 A1 * | 1/2008 | Aldana ...................... 455/277.1 |
| 2008/0069063 A1 * | 3/2008 | Li et al. ....................... 370/338 |
| 2009/0082017 A1 | 3/2009 | Chang et al. |
| 2010/0173600 A1 * | 7/2010 | Izumi et al. ................. 455/272 |
| 2010/0279714 A1 * | 11/2010 | Chin et al. ................... 455/458 |
| 2012/0093007 A1 | 4/2012 | Kang et al. |

FOREIGN PATENT DOCUMENTS

| | | |
|---|---|---|
| KR | 10-1999-0039475 A | 6/1999 |
| KR | 10-2006-0063547 A | 6/2006 |
| KR | 10-2008-0066898 A | 7/2008 |
| KR | 10-2009-0069128 A | 6/2009 |
| KR | 10-2012-0071239 A | 7/2012 |

* cited by examiner

*Primary Examiner* — Zewdu A Beyen
(74) *Attorney, Agent, or Firm* — Jefferson IP Law, LLP

(57) ABSTRACT

An apparatus and a method for receiving a multiple frequency band are provided. In the method for receiving a multiple frequency band of a terminal is a mobile communication system, respective received signal strengths or respective gains are measured with respect to a signal received via at least one Radio Frequency (RF) chain. Whether multiple frequency band reception that uses a single RF chain is possible is determined using the respective received signal strengths or the respective gains. When the multiple frequency band reception that uses the single RF chain is possible, the multiple frequency band is received using the single RF chain.

14 Claims, 15 Drawing Sheets

APPARATUS AND METHOD FOR RECEIVING MULTIPLE FREQUENCY ALLOCATIONS (FAS) IN A MOBILE COMMUNICATION SYSTEM

BACKGROUND OF THE INVENTION

1. Field of the Invention

The present invention relates to an apparatus and a method for receiving a multiple Frequency Allocation (FA) for a mobile communication terminal in a mobile communication system.

2. Description of the Related Art

In an Institute of Electrical and Electronics Engineers (IEEE) wireless Metropolitan Area Network (MAN) system, a Frequency Overlay function is required for simultaneously supporting terminals having different bandwidths of the same frequency band.

FIG. 1 is a view illustrating a frequency overlay system that simultaneously supports two terminals using a frequency bandwidth of 20 MHz when a 10 MHz-terminal and a 20 MHz-terminal coexist simultaneously.

Referring to FIG. 1, to support a frequency overlay function, a narrow band terminal (10 MHz) 110 uses a narrow band (10 MHz) FA, and a broadband terminal (20 MHz) 120 uses a broadband (20 MHz) using a plurality of narrow band (10 MHz) FAs (that is, two narrow bands for a 20 MHz-system).

An International Mobile Telecommunication (IMT)-advanced system requires different FA depending on a nation and a company, and an IEEE 802.16m system supports a scalable bandwidth ranging from 5 MHz to 40 MHz. This may be realized via transmission/reception of a single carrier or a multiple radio frequency carrier.

FIG. 2 is a view illustrating a system where a 20 MHz-terminal uses two bandwidths of 10 MHz.

Referring to FIG. 2, a 20-MHz terminal 210 that supports a multiple RF carrier uses two bandwidths of 10 MHz.

In this case, it is easy for base station equipment to use a single broadband transmitter/receiver for transmission to a plurality of terminals via a plurality of frequency channels. However, it is more reasonable that a terminal uses one narrowband transceiver or a plurality of narrowband transceivers having the same bandwidth as a legacy system due to hardware complexity and backward compatibility.

An IEEE 802.16m communication system may use a multiple carrier in order to improve a data transmission rate and support a specific service. Here, a carrier that a terminal accesses via synchronization and an access is called a primary carrier, and an additional carrier is called a secondary carrier.

In an IEEE 802.16m communication system, a primary carrier and a secondary carrier may be allocated to a contiguous spectrum or a non-contiguous spectrum. In addition, whether a terminal supports a multiple carrier may be determined by message exchange between a base station and a terminal.

To receive two contiguous FA using a double RF chain terminal, respective RF chains are used when data is received in contiguous frequency channels (for example, frequency channels #2 and #3). In addition, a center frequency of a mixer is set to frequencies of frequency channels #2 and #3, so that a baseband signal is processed.

Since a double RF chain terminal receives two frequency channels via respective RF chains, a signal RF chain receiver structure is further required additionally, and a related analog device (that is, an external Low Noise Amplifier (LNA), an Analog to Digital Converter (ADC)), etc. are additionally used. In addition, since a double RF chain structure uses an independent RF chain with respect to each FA, RF gain control is easy but consumes two times more analog device power than a single RF chain structure.

That is, in the case where an independent RF chain and an analog device are used for receiving a multiple carrier, power consumption by RF chains and analog devices increased as much as the number of simultaneously supported carriers is large.

Therefore, an apparatus and a method for receiving a multiple carrier using one RF chain are required.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for receiving multiple FA in a mobile communication system.

Another aspect of the present invention is to provide an apparatus and a method for receiving two contiguous FA using one RF chain in a mobile communication terminal.

Still another aspect of the present invention is to provide a receiver structure of a terminal, for supporting a multiple carrier in a mobile communication system.

Yet another aspect of the present invention is to provide an apparatus and a method for determining a multiple carrier mode and a single carrier mode in a mobile communication system.

In accordance with an aspect of the present invention, a method for receiving a multiple frequency band of a terminal in a mobile communication system is provided. The method includes measuring respective received signal strengths or respective gains with respect to signals received via at least one Radio Frequency (RF) chain, determining whether multiple frequency band reception that uses a single RF chain is possible using the respective received signal strengths or the respective gains, and when the multiple frequency band reception that uses the single RF chain is possible, receiving the multiple frequency band using the single RF chain.

In accordance with another aspect of the present invention, an apparatus of a terminal, for receiving a multiple frequency band in a mobile communication system is provided. The apparatus includes a receiver for measuring respective received signal strengths or respective gains with respect to signals received via at least one Radio Frequency (RF) chain, and a controller for determining whether multiple frequency band reception that uses a single RF chain is possible using the respective received signal strengths or the respective gains, and when the multiple frequency band reception that uses the single RF chain is possible, receiving the multiple frequency band using the single RF chain.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for receiving a multiple FA in a mobile communication system.

Basically, a terminal performs synchronization and an access, and performs data communication via a primary carrier. A base station determines whether to support a multiple carrier of the terminal during an access process, and the terminal is allocated a resource via an additional carrier when needed.

The present invention proposes a method for using both a single carrier mode and a double carrier mode together based on a double RF chain structure, which is a minimum unit of a structure of a terminal supporting a multiple carrier.

Figure 1:
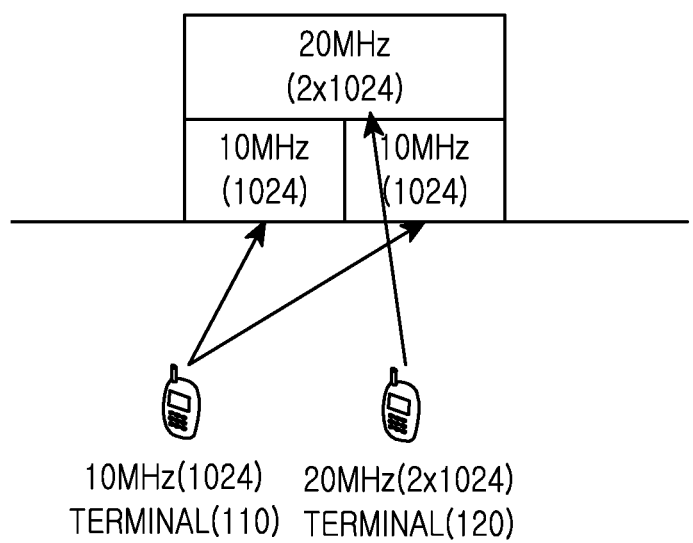
FIG. 1 is a view illustrating a frequency overlay system that simultaneously supports two terminals using a frequency bandwidth of 20 MHz when a 10 MHz-terminal and a 20 MHz-terminal coexist simultaneously.
Figure 2:
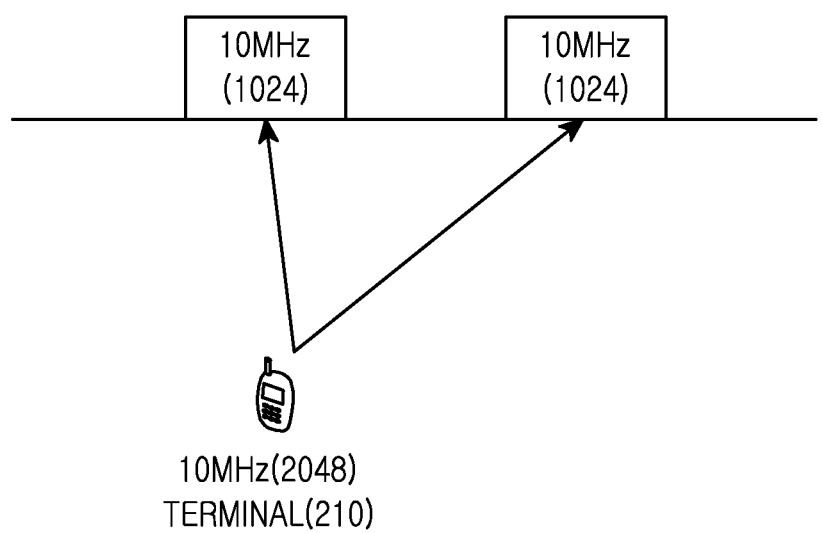
FIG. 2 is a view illustrating a system where a 20 MHz-terminal uses two bandwidths of 10 MHz.
Figure 3:
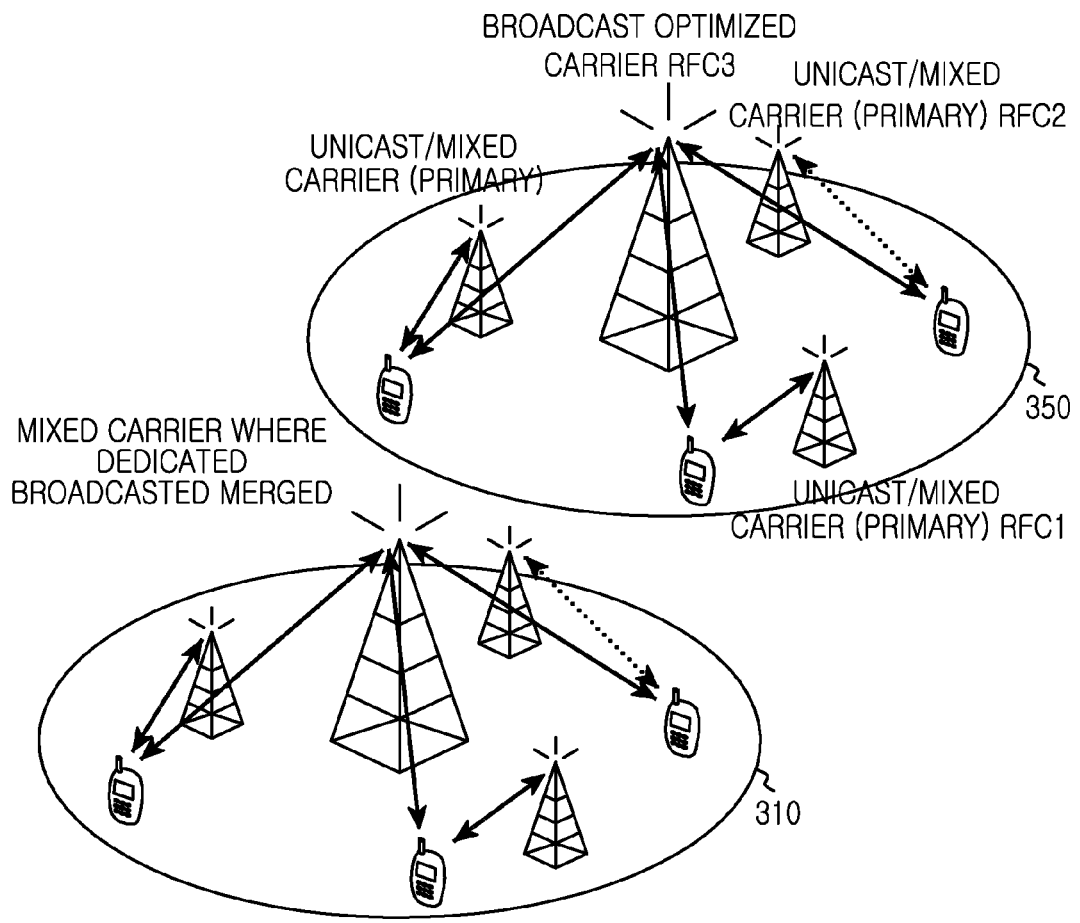
FIG. 3 is a view illustrating an E-MBS system that uses a broadcast only carrier and a unicast/mixed carrier according to an exemplary embodiment of the present invention.

FIG. 3 is a view illustrating an E-MBS system that uses a broadcast only carrier and a unicast/mixed carrier according to an exemplary embodiment of the present invention.

Referring to FIG. 3, an IEEE 802.16m system supports an Enhanced Multicast and Broadcast Service (E-MBS) 310 and 350 that transmits one source to a plurality of terminals simultaneously. In this case, a base station transmits a data packet via one broadcast only carrier (dedicated carrier), and transmits a related control signal via a unicast/mixed carrier.

Figure 4:
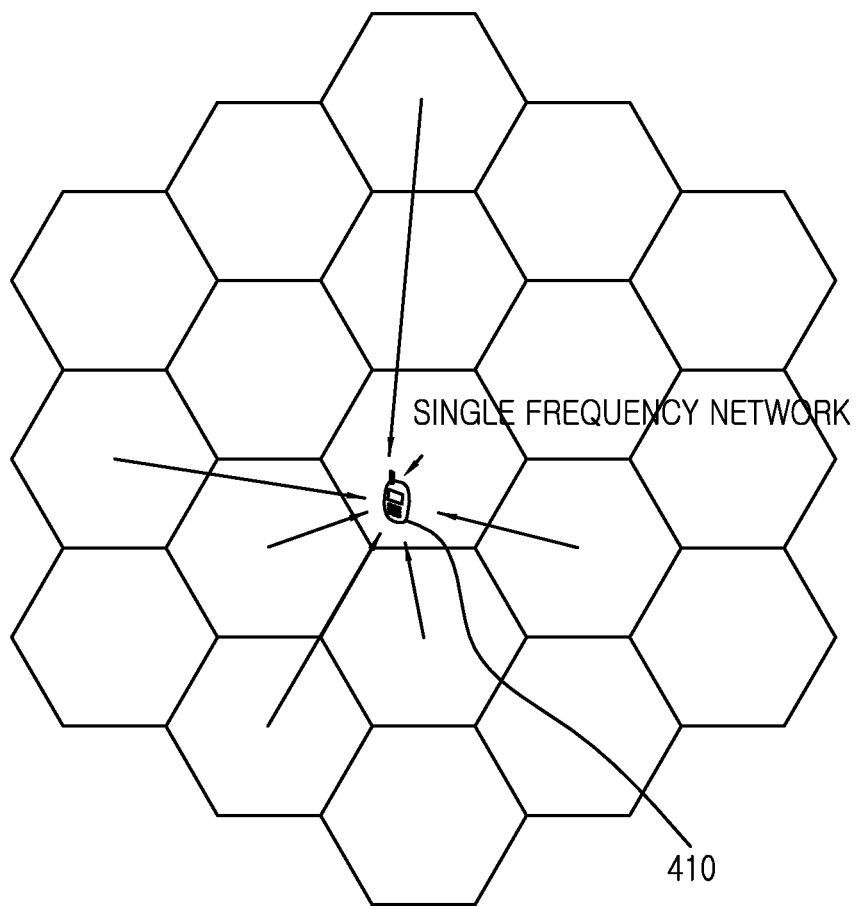
FIG. 4 is a view illustrating a Single Frequency Network (SFN) system where a multiple cell transmits a data packet via the same frequency according to an exemplary embodiment of the present invention.

FIG. 4 is a view illustrating a Single Frequency Network (SFN) system where a multiple cell transmits a data packet via the same frequency according to an exemplary embodiment of the present invention.

Referring to FIG. 4, in the case where E-MBS that uses a broadcast only carrier is supported, a terminal 410 operates in a multiple carrier support mode that receives a multicast/broadcast signal via an E-MBS dedicated carrier, and performs general data communication via other carriers. In the case where a carrier for the general data communication and a dedicated carrier for E-MBS are contiguous, reception using a single RF chain structure is possible.

Figure 5:
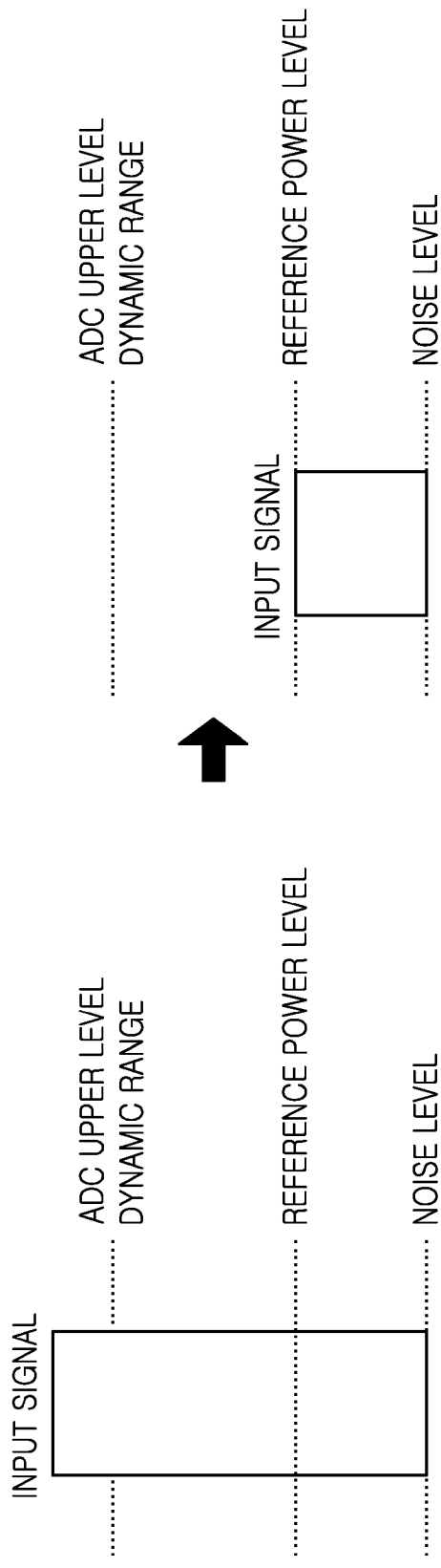
FIG. 5 is a view illustrating a process for controlling an ADC dynamic range and an AGC gain with respect to an FA signal according to an exemplary embodiment of the present invention.

FIG. 5 is a view illustrating a process for controlling an ADC dynamic range and an AGC gain with respect to an FA signal according to an exemplary embodiment of the present invention.

Referring to FIG. 5, a size of a single FA signal is controlled to a reference power level within an input dynamic range of an ADC by AGC.

An operation range of the ADC includes an SNR required for decoding a received signal, a margin for fading of a frequency channel, and a Peak-to-Average Power Ratio (PAPR) margin of a received signal.

When the operation range is large, gain control of a signal is easy, but there is a limitation in manufacturing a large operation range in case of a high speed ADC used for broadband data communication. Therefore, a signal is controlled to a reference power level that guarantees a minimum SNR using a gain controller, so that signal distortion is not generated by ADC clipping.

Figure 6:
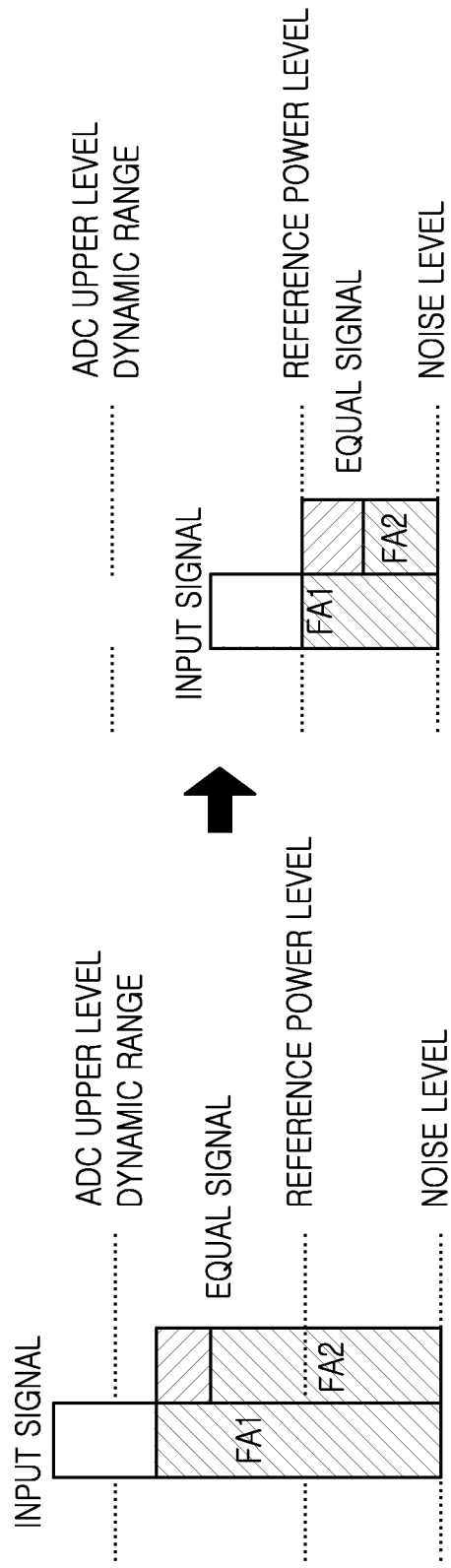
FIG. 6 is a view illustrating a process for controlling contiguous 2 FA signals to a reference power level by AGC gain control when receiving the contiguous 2 FA signals via a single RF chain structure.

FIG. 6 is a view illustrating a process for controlling contiguous 2 FA signals to a reference power level by AGC gain control when receiving the contiguous 2 FA signals via a single RF chain structure.

Referring to FIG. 6, since a single RF chain structure regards received signals of 2 FA as one input signal to perform gain control, in the case where received signal levels of two contiguous FA are different from each other, an FA2 signal is set lower than an actual reference power level as illustrated in the drawing. Therefore, an SNR of a signal may be lowered by a noise level.

More particularly, since a signal of an E-MBS dedicated carrier is transmitted with high power for performance improvement, the signal may be transmitted with high power compared to a carrier signal for general data communication, and the above-described problem may occur. That is, a 2 FA signal received in a terminal may change depending on an environment inside a cell.

Figure 7:
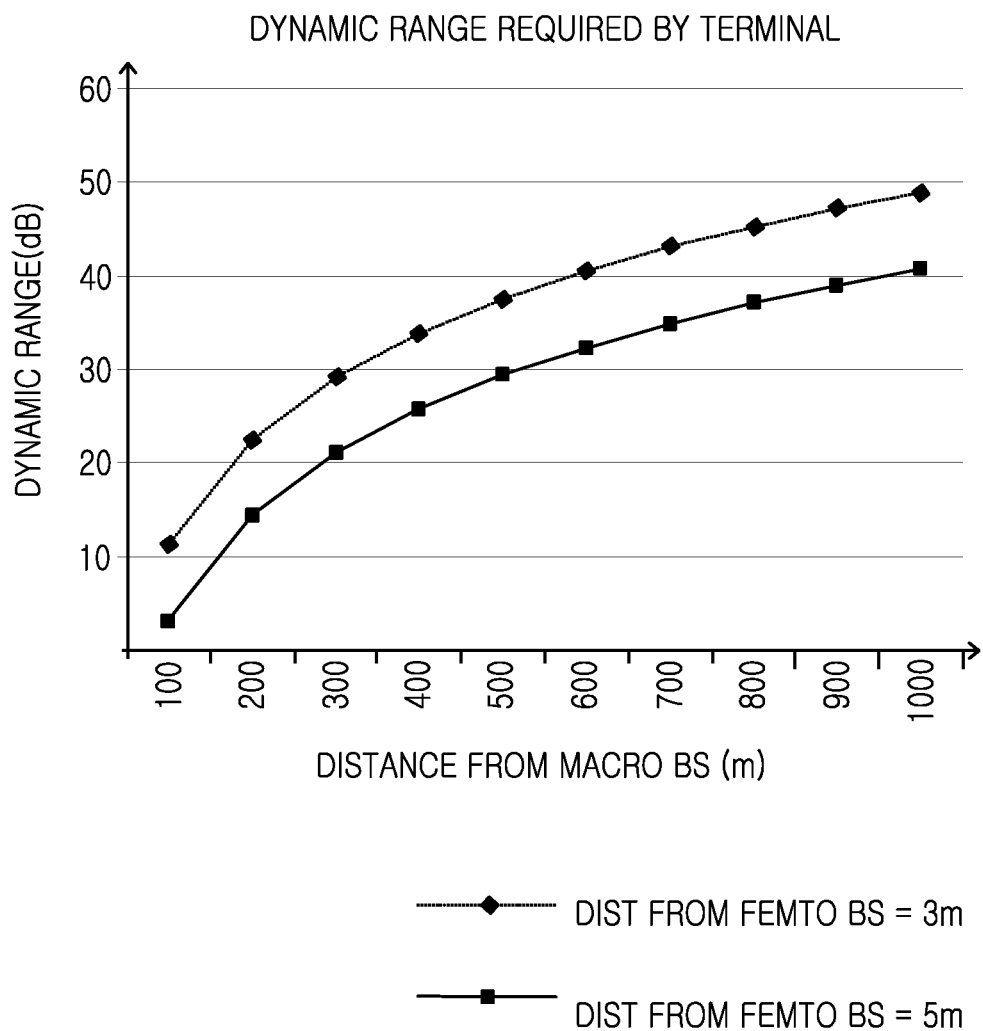
FIG. 7 is a graph illustrating power difference between a signal received from a macro cell base station and a signal received from a neighbor femto cell inside a cell depending on a distance from the macro cell base station according to an exemplary embodiment of the present invention.

FIG. 7 is a graph illustrating power difference between a signal received from a macro cell base station and a signal received from a neighbor femto cell inside a cell depending on a distance from the macro cell base station according to an exemplary embodiment of the present invention.

Referring to FIG. 7, when separated by about 500 m from the macro cell base station, a signal level difference between a macro cell signal and a femto cell signal received in a terminal shows 30 dB or more. When IEEE 802.16m allocates a resource to contiguous 2 FA for data transmission rate improvement, a terminal may receive data via a single carrier mode.

Figure 8:
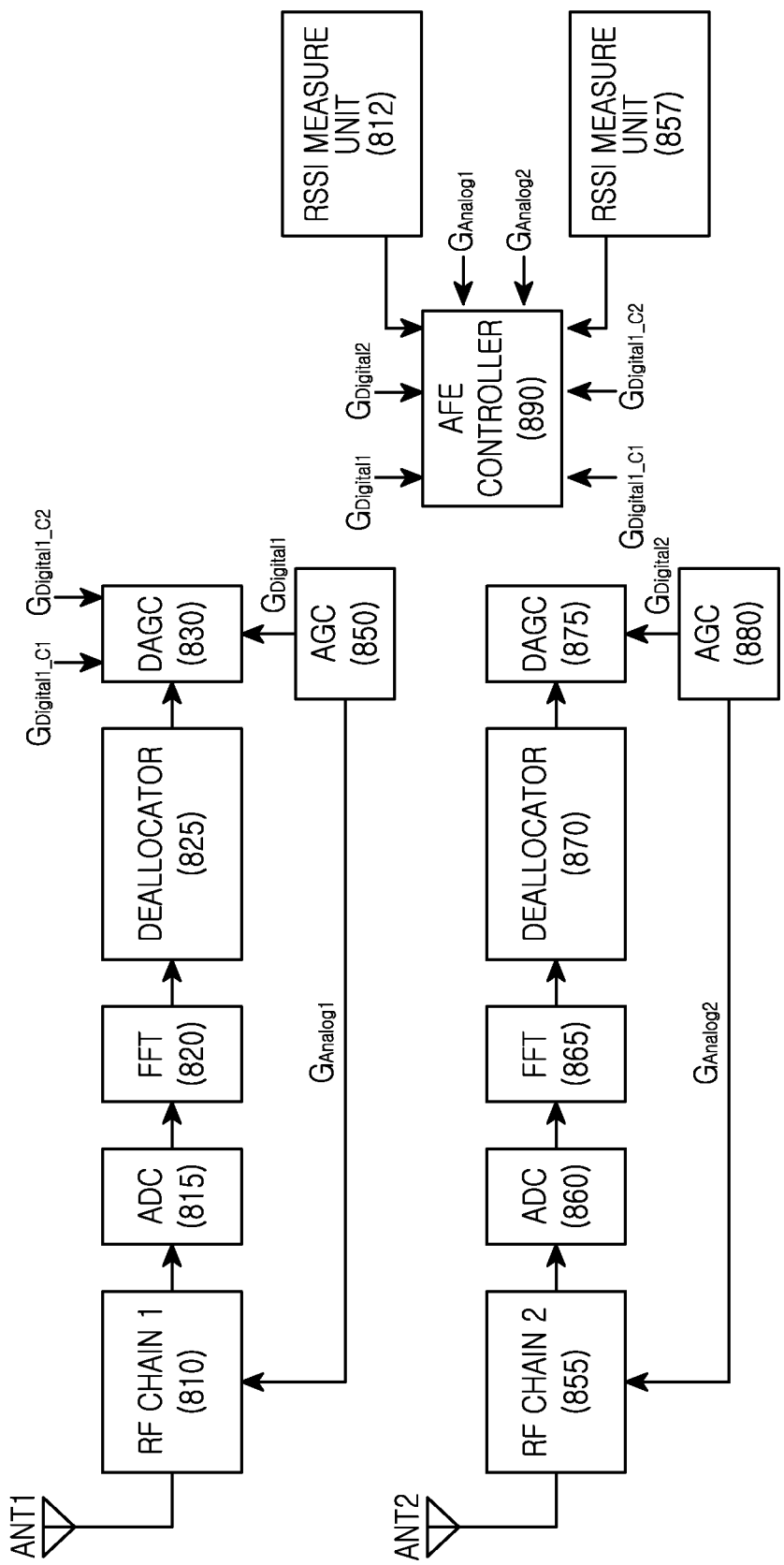
FIG. 8 is a block diagram illustrating a terminal having a double RF chain structure according to an exemplary embodiment of the present invention.

FIG. 8 is a block diagram illustrating a terminal having a double RF chain structure according to an exemplary embodiment of the present invention.

The terminal includes an RF chain 1 810, an RF chain 2 855, Received Signal Strength Indicator (RSSI) measure units 812, 857, ADC 815, 860, Fast Fourier Transform 820, 865, deallocators 825, 870, DAGC 830, 875, AGC 850, 880, and an Analog Front End (AFE) controller 890.

Referring to FIG. 8, during a reception section, the RF chains 1, 2 810 and 855 convert an RF signal received via an antenna into a baseband analog signal. The RSSI measure units 812, 857 measure received signal strengths of RF signals received via ANT1 and ANT2, respectively.

The ADC 815, 860 convert analog signals from the RF chain 1 810 and the RF chain 2 855 into sample data, and output the same. The FFT 820, 865 perform FFT on sample data output from the ADC 815, 860 to output data in a frequency domain. The deallocators 825, 870 separate data of a secondary carrier which the terminal actually desires to receive from data in the frequency domain from the FFT 820, 865, and select the same.

The AGC 850, 880 measure an analog gain of a received signal, and provide the measured gain value to the RF chain 1 810 and the RF chain 2 855 to allow them to reflect the gain. In addition, the AGC 850, 880 measure a digital gain of a received signal and provide the measured gain value to the DAGC 830, 875 to allow them to reflect the gain.

The AFE controller 890 determines whether to operate in a double carrier mode that uses two RF chains, or to operate in a double carrier mode that uses one RF chain based on RSSI provided by the RSSI measure units 812, 857.

In addition, the AFE controller 890 determines whether to operate in the double carrier mode that uses two RF chains, or to operate in the double carrier mode that uses one RF chain based on a gain measured by the AGC 850, 860.

Other functional blocks 810 to 880 except the AFE controller 890 are elements forming a receiver. In addition, though not shown in the drawing, functional blocks that perform inverse processes of the other functional blocks 810 to 880 may form a transmitter.

Figure 9:
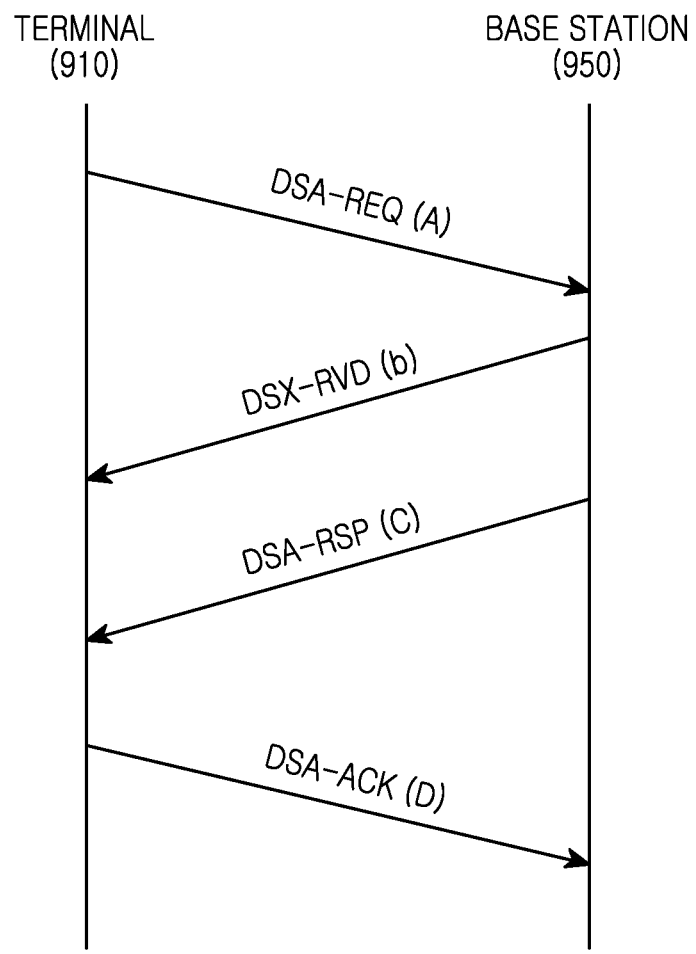
FIG. 9 is a view illustrating a DSA message flow according to an exemplary embodiment of the present invention.

FIG. 9 is a view illustrating a DSA message flow according to an exemplary embodiment of the present invention.

Referring to FIG. 9, a terminal 910 and a base station 950 support an MBS via a dynamic service flow. The terminal 910 that desires to receive an MBS transmits a service flow reference and a Quality of Service (QoS) parameter via a DSA-REQ message (step a), and the base station 920 informs the terminal 910 that whether the DSA-REQ message has been received via a DSX-RVD message (step b).

After that, the base station 950 transmits information regarding whether it can support a service requested by the terminal 910, and information regarding a frequency channel via which it can transmit the service when it can support the service, via the DSA-RSP message (step c). The base station 950 transmits information of whether it can support an MBS, an MBS via a mixed/unicast carrier, or a broadcast only service via a dedicated carrier, etc. to the terminal 910 via the DSA-RSP message.

After that, the terminal 910 transmits a DSA-ACK as a response (step d), so that an MBS starts.

Figure 10:
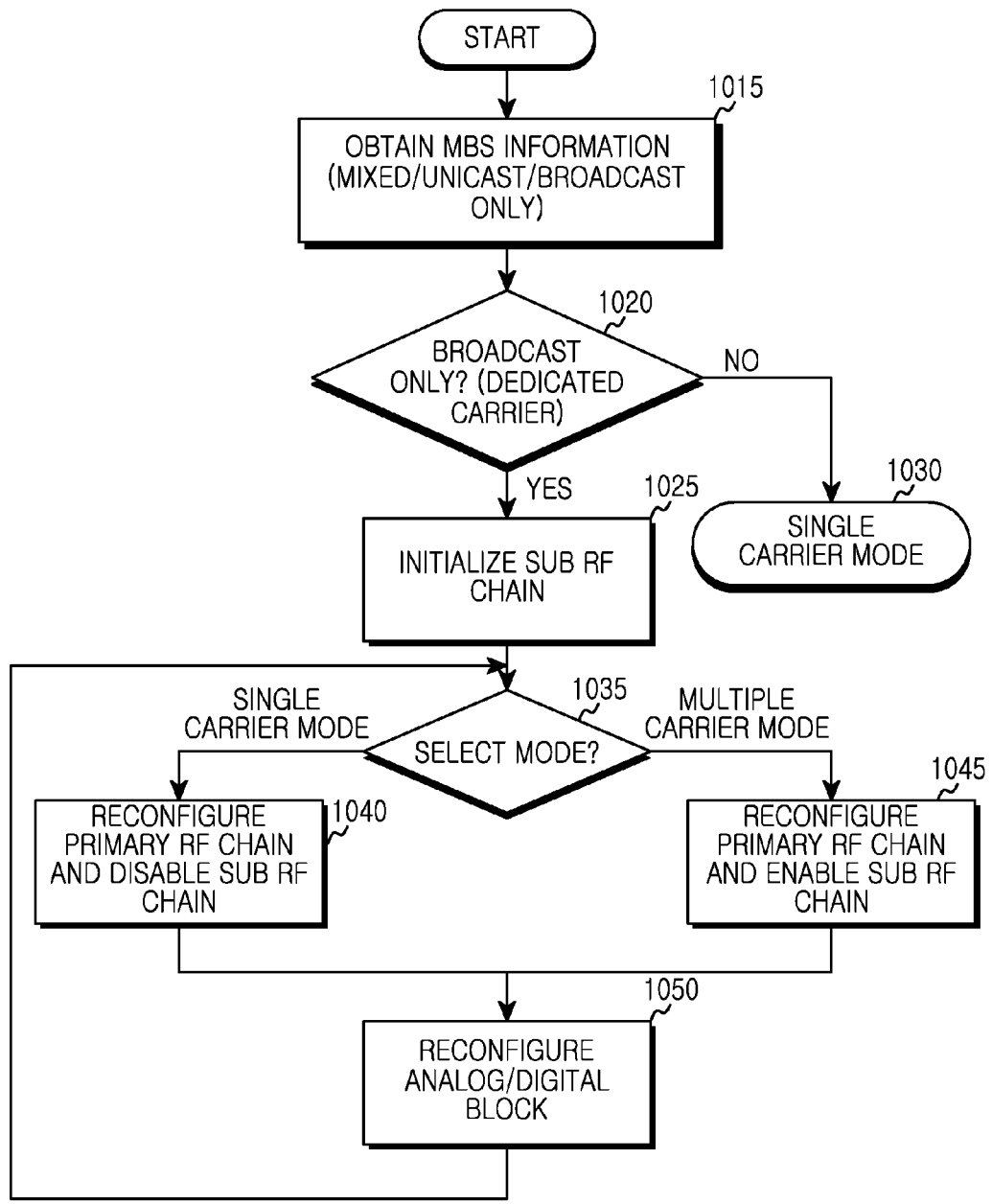
FIG. 10 is a flowchart illustrating a process for setting an operation mode of a terminal in case of supporting an MBS via a dedicated carrier according to an exemplary embodiment of the present invention.

FIG. 10 is a flowchart illustrating a process for setting an operation mode of a terminal in case of supporting an MBS via a dedicated carrier according to an exemplary embodiment of the present invention.

Referring to FIG. 10, a terminal obtains information of whether it can support an MBS, an MBS via a mixed/unicast carrier, or a broadcast only service via a dedicated carrier, etc. via a DSA-RSP message from a base station (step 1015).

When the terminal is not broadcast only (step 1020), the terminal operates in a single carrier mode (step 1030).

When the terminal is broadcast only (step 1020), the terminal activates a sub RF chain, and performs an initialization operation for receiving a secondary carrier (step 1025). Here, an RF chain that receives a primary carrier is called a primary RF chain, and an RF chain that receives a secondary carrier is called a sub RF chain. The terminal performs data communication via a primary carrier and performs an MBS via a secondary carrier, simultaneously.

An AFE controller of the terminal tracks information regarding quality of a signal received via a primary/sub RF chain. In the case where a primary carrier and a secondary carrier are contiguous frequency channels and a reception signal of a 2 FA tracked by the AFE controller is a level receivable via a single RF chain, the terminal is set to a single carrier mode (step 1035).

In case of changing from a double carrier mode to a single carrier mode, a sub RF chain is disabled. In addition, a center frequency change of a primary RF chain, and operation mode changes of an ADC, an FFT, and a deallocator are performed (step 1040, step 1050). Here, in case of the ADC, change of a clock corresponding to a bandwidth of 2 FA is required. In case of the FFT, a size of the FFT should be controlled so that it is operable for 2 FA. In case of the deallocator, a secondary carrier received from 2 FA is separated.

In the case where a primary carrier and a secondary carrier are contiguous frequency channels and a reception signal of a 2 FA tracked by the AFE controller is not a level receivable via a single RF chain, the terminal is set to a double carrier mode (step 1035).

In case of changing from a single carrier mode to a double carrier mode, a sub RF chain is enabled. In addition, a center frequency change of the primary RF chain, and operation mode changes of the ADC, the FFT, and the deallocator are performed (step 1045, step 1050). Here, in case of the ADC, change of a clock corresponding to a bandwidth of a frequency channel is required. In case of the FFT, a size of the FFT should be controlled so that it is operable for 1 FA. In case of the deallocator, a secondary carrier received from 1 FA is separated.

Change between a double carrier mode and a single carrier mode is described with reference to FIGS. 11 and 12 below.

Figure 11:
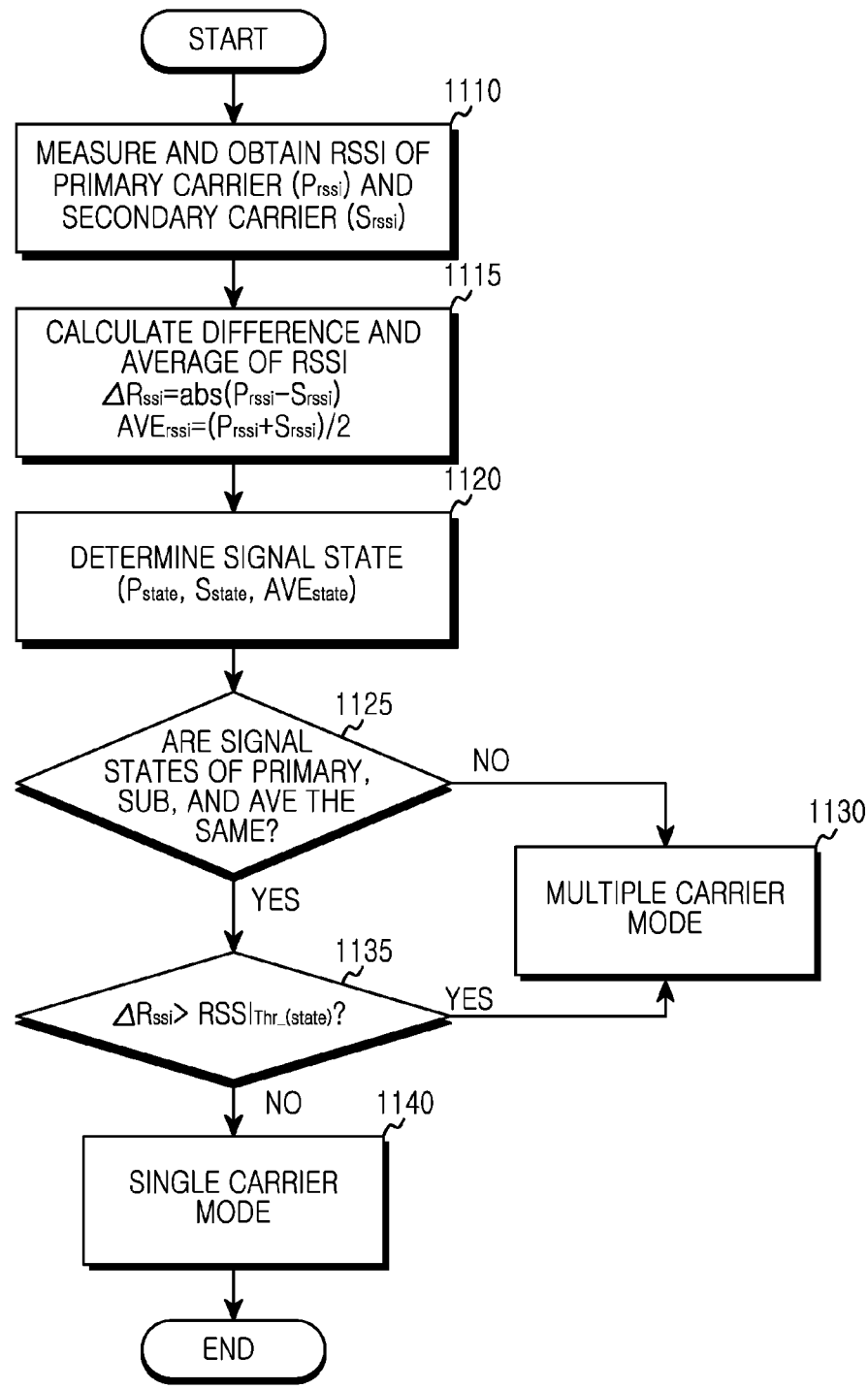
FIG. 11 is a flowchart illustrating a process for determining a mode using an RSSI according to an exemplary embodiment of the present invention.

FIG. 11 is a flowchart illustrating a process for determining a mode using an RSSI according to an exemplary embodiment of the present invention.

Referring to FIG. 11, the AFE controller may determine received signal quality of a primary RF chain and a sub RF chain using an RSSI. Received signal strength of the primary RF chain is referred to as $P_{rssi}$, and received signal strength of the sub RF chain is referred to as $S_{rssi}$.

First, the RSSI measure unit measures received signal strengths of a primary RF chain and a sub RF chain (step 1110), and the AFE controller calculates a difference between received signal strengths of the primary RF chain and the sub RF chain ($\Delta Rssi=abs(P_{rssi}-S_{rssi})$) and calculates an average thereof ($AVE_{rssi}=(P_{rssi}+S_{rssi})/2$) (step 1115).

After that, the AFE controller determines a state (strong electric field, medium electric field, and weak electric field) based on received signal strength ($P_{rssi}$) of the primary carrier, received signal strength ($S_{rssi}$) of the secondary carrier, and an average received signal strength $AVE_{rssi}$ (step 1120).

In determining a state, when a measured received signal strength is greater than $RSSI_{THR\_high}$, the AFE controller determines a strong electric field. When the measured received signal strength is between $RSSI_{THR\_low}$ and $RSSI_{THR\_high}$, the AFE controller determines a medium electric field. When the measured received signal strength is less than $RSSI_{THR\_low}$, the AFE controller determines a weak electric field. Here, $RSSI_{THR\_high}$ and $RSSI_{THR\_low}$ may be determined as appropriate values depending on a communication system.

When states of received signal strengths of the primary carrier and the secondary carrier and a state of an average thereof are different from one another (step 1125), the terminal determines that a signal level difference between FA is large and operates in a multiple carrier mode (step 1130). Here, difference of the states denotes that states are different, for example, as in the case where a state of received signal strength is a medium electric field and a state of an average is a strong electric field.

In the case where states of received signal strengths of the primary carrier and the secondary carrier and a state of the average are equal to one another (step 1125), whether a difference ($\Delta RSSI$) of received signal strength is less than $RSSI_{Thr}$ is determined (step 1135), and when the difference is less than $RSSI_{Thr}$, the terminal is switched to a single carrier mode (step 1140).

In the case where states of received signal strengths of the primary carrier and the secondary carrier and a state of the average are equal to one another (step 1125), whether a difference ($\Delta RSSI$) of received signal strength is greater than $RSSI_{Thr}$ is determined (step 1135), and when the difference is greater than $RSSI_{Thr}$, the terminal is switched to a multiple carrier mode (step 1130).

The $RSSI_{Thr}$ is a value of a level where signal distortion does not occur within an operation range of an ADC in the case where 2 FA is received via a single RF chain and a gain is controlled, and is determined depending on an ADC performance in use, reference power setting, and a channel environment (strong electric field, medium electric field, and weak electric field).

Figure 12:
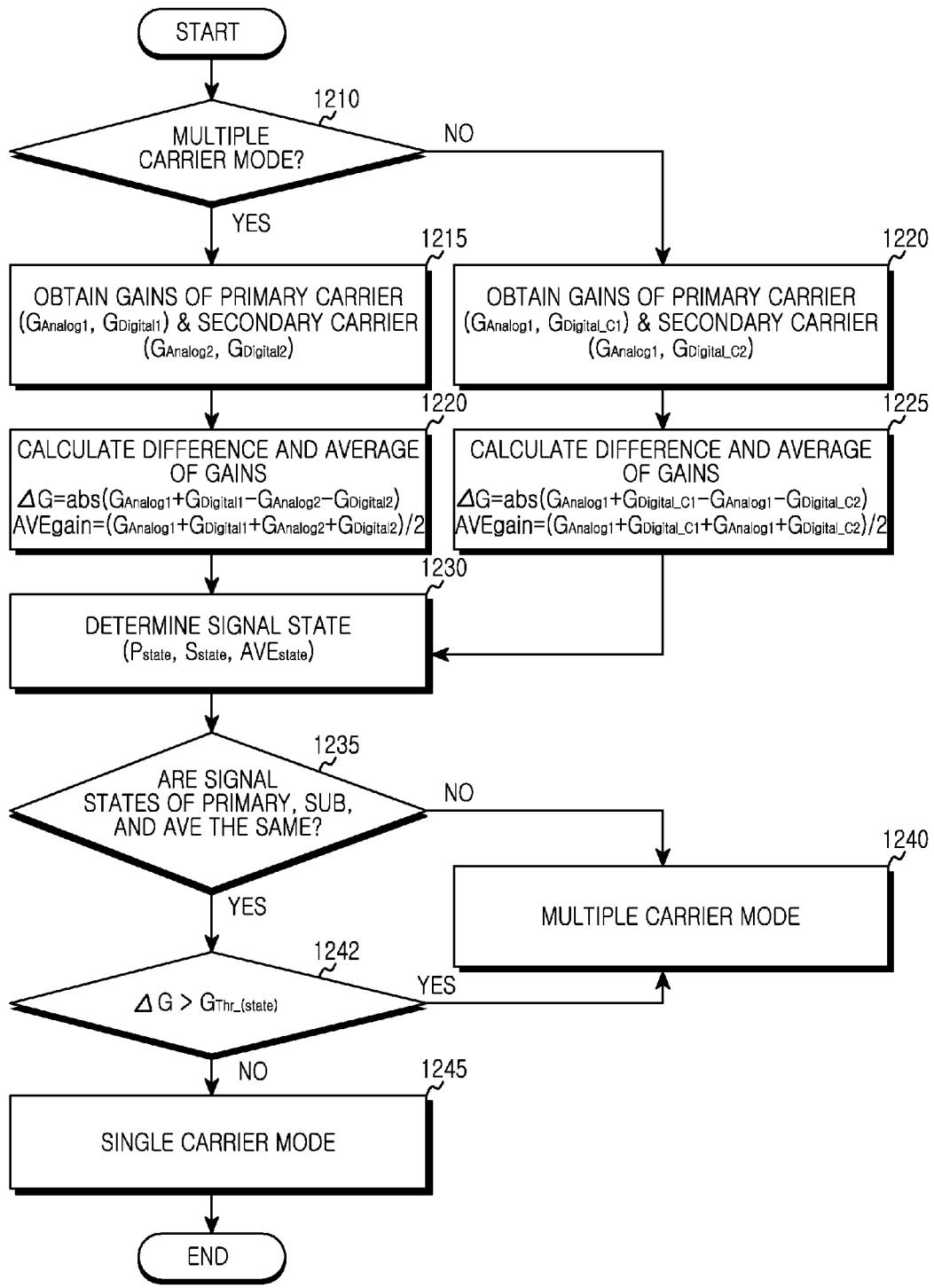
FIG. 12 is a flowchart illustrating a process for determining a mode using a gain value according to an exemplary embodiment of the present invention.

FIG. 12 is a flowchart illustrating a process for determining a mode using a gain value according to an exemplary embodiment of the present invention.

Referring to FIG. 12, received signal quality of a primary RF chain and a sub RF chain may be determined using an RF chain gain. Here, gains applied to a primary carrier and a secondary carrier may be obtained as follows.

In case of supporting two carriers via a multiple carrier mode (here, a double RF chain structure), a gain applied to an RF chain that receives each carrier and a digital gain may be used.

Currently, in case of a multiple carrier mode that uses two RF chains (step 1210), an operation of a terminal is as follows.

First, AGC determines a gain regarding a primary carrier and a secondary carrier (step 1215). In case of receiving the primary carrier from an RF chain 1 of FIG. 8, a gain reflected to the primary carrier is $G_P=G_{Analog1}+G_{Digital1}$. In case of receiving a secondary carrier from an RF chain 2 of FIG. 8, a gain reflected to the secondary carrier is $G_S=G_{Analog2}+G_{Digital2}$.

After that, the AFE controller calculates a difference ($\Delta G=abs(G_{Analog1}+G_{Digital1}-G_{Analog2}-G_{Digital2})$) between the gain of the primary carrier and the gain of the secondary carrier, and an average gain ($AVE_{gain}=(G_{Analog1}+G_{Digital1}+G_{Analog2}+G_{Digital2})/2$) (step 1220).

The AFE controller determines a signal state (strong electric field, medium electric field, and weak electric field) based on a difference between the gain of the primary carrier and the gain of the secondary carrier, and an average gain (step 1230).

In determining a state, when a gain reflected to each carrier is greater than $G_{THR\_High}$, a signal state is determined as a weak electric field. When the gain is between $G_{THR\_Low}$ and $G_{THR\_High}$, a signal state is determined as a medium electric field. When the gain is less than $G_{THR\_Low}$, a signal state is determined as a strong electric field. Here, $G_{THR\_High}$ and $G_{THR\_Low}$ may be determined depending on a communication system.

After that, when states of gains of a primary carrier and a secondary carrier and a state of an average are different from one another (step 1235), the AFE controller determines that a difference of a signal level between FA is large, and the terminal operates in a multiple carrier mode (step 1240).

When the state of the gains of the primary carrier and the secondary carrier and the state of the average AVE are the same (step 1235), the AFE controller determines whether a difference $\Delta G$ between the gains of the primary carrier and the secondary carrier is less than a threshold $G_{Thr}$ (step 1242).

When the difference is less than the threshold, the terminal switches to a single carrier mode (step 1245).

When the state of the gains of the primary carrier and the secondary carrier and the state of the average AVE are the same (step 1235), the AFE controller determines whether the difference $\Delta G$ between the gains of the primary carrier and the secondary carrier is greater than the threshold $G_{Thr}$ (step 1242). When the difference is greater than the threshold, the terminal switches to a multiple carrier mode (step 1240).

The value $G_{Thr}$ is a value of a level where signal distortion does not occur within an operation range of an ADC in the case where 2FA is received via a single RF chain and a gain is controlled, and is determined depending on an ADC performance, a reference power setting value, and a channel environment (strong electric field, medium electric field, and weak electric field).

In contrast, in case of a non-multiple carrier mode that uses two RF chains, that is, in case of a multiple carrier mode that uses one RF chain (step 1210), the terminal operates as follows.

First, an AGC obtains a gain regarding a primary carrier and a secondary carrier (step 1220). In the case where the terminal supports 2FA reception via a single carrier mode (here, case of using only an RF chain 1), a gain reflected to the primary carrier is $G_P=G_{Analog1}+G_{Digital1\_C1}$, and a gain reflected to the secondary carrier is $G_S=G_{Analog1}+G_{Digital1\_C2}$. Here, $G_{Digital1\_C1}$ and $G_{Digital1\_C2}$ are gains measured based on a signal for each carrier discriminated after the operation of the deallocator.

After that, the AFE controller calculates a difference (Δ G=abs($G_{Analog1}+G_{Digital1\_C1}-G_{Analog1}-G_{Digital1\_C2}$)) between the gain of the primary carrier and the gain of the secondary carrier, and an average gain ($AVE_{gain}=(G_{Analog1}+G_{Digital1\_C1}+G_{Analog1}+G_{Digital1\_C2})/2$) (step 1225).

The AFE controller determines a signal state (strong electric field, medium electric field, and weak electric field) based on a difference between the gain of primary carrier and the gain of the secondary carrier, and an average gain (step 1230).

In determining a state, when a gain reflected to each carrier is greater than $G_{THR\_High}$, a signal state is determined as a weak electric field. When the gain is between $G_{THR\_Low}$ and $G_{THR\_High}$, a signal state is determined as a medium electric field. When the gain is less than $G_{THR\_Low}$, a signal state is determined as a strong electric field. Here, $G_{THR\_High}$ and $G_{THR\_Low}$ may be determined depending on a communication system.

After that, when states of gains of a primary carrier and a secondary carrier and a state of an average are different from one another, the AFE controller determines that a difference of a signal level between FA is large, and the terminal operates in a multiple carrier mode (step 1240).

When the state of the gains of the primary carrier and the secondary carrier and the state of the average AVE are the same (step 1235), the AFE controller determines whether a difference Δ G between the gains of the primary carrier and the secondary carrier is less than a threshold $G_{Thr}$ (step 1242). When the difference is less than the threshold, the terminal switches to a single carrier mode (step 1245).

When the state of the gains of the primary carrier and the secondary carrier and the state of the average AVE are the same (step 1235), the AFE controller determines whether the difference Δ G between the gains of the primary carrier and the secondary carrier is greater than the threshold $G_{Thr}$ (step 1242). When the difference is greater than the threshold, the terminal switches to a multiple carrier mode (step 1240).

The value $G_{Thr}$ is a value of a level where signal distortion does not occur within an operation range of an ADC in the case where 2FA is received via a single RF chain and a gain is controlled, and is determined depending on an ADC performance, a reference power setting value, and a channel environment (strong electric field, medium electric field, and weak electric field).

Figure 13:
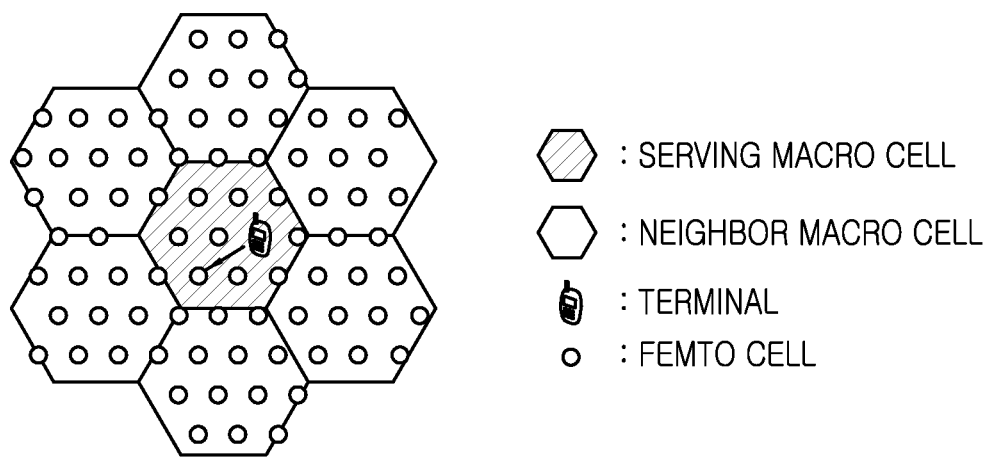
FIG. 13 is a view illustrating a handover state of a terminal under an environment where a macro cell and a femto cell are mixed according to an exemplary embodiment of the present invention.

FIG. 13 is a view illustrating a handover state of a terminal under an environment where a macro cell and a femto cell are mixed according to an exemplary embodiment of the present invention.

Referring to FIG. 13, femto cells mixed inside a macro cell are conceptually illustrated. This is for supporting a handover of a terminal between the macro cell and a femto cell.

The terminal performs data communication via FA allocated to the macro cell, and a contiguous femto cell performs data communication via FA allocated to each femto cell. The terminal measures an Inter Working Signal (IWS) of a femto cell in order to measure signal quality of a femto cell, and performs a handover to a relevant femto cell when needed.

Figure 14:
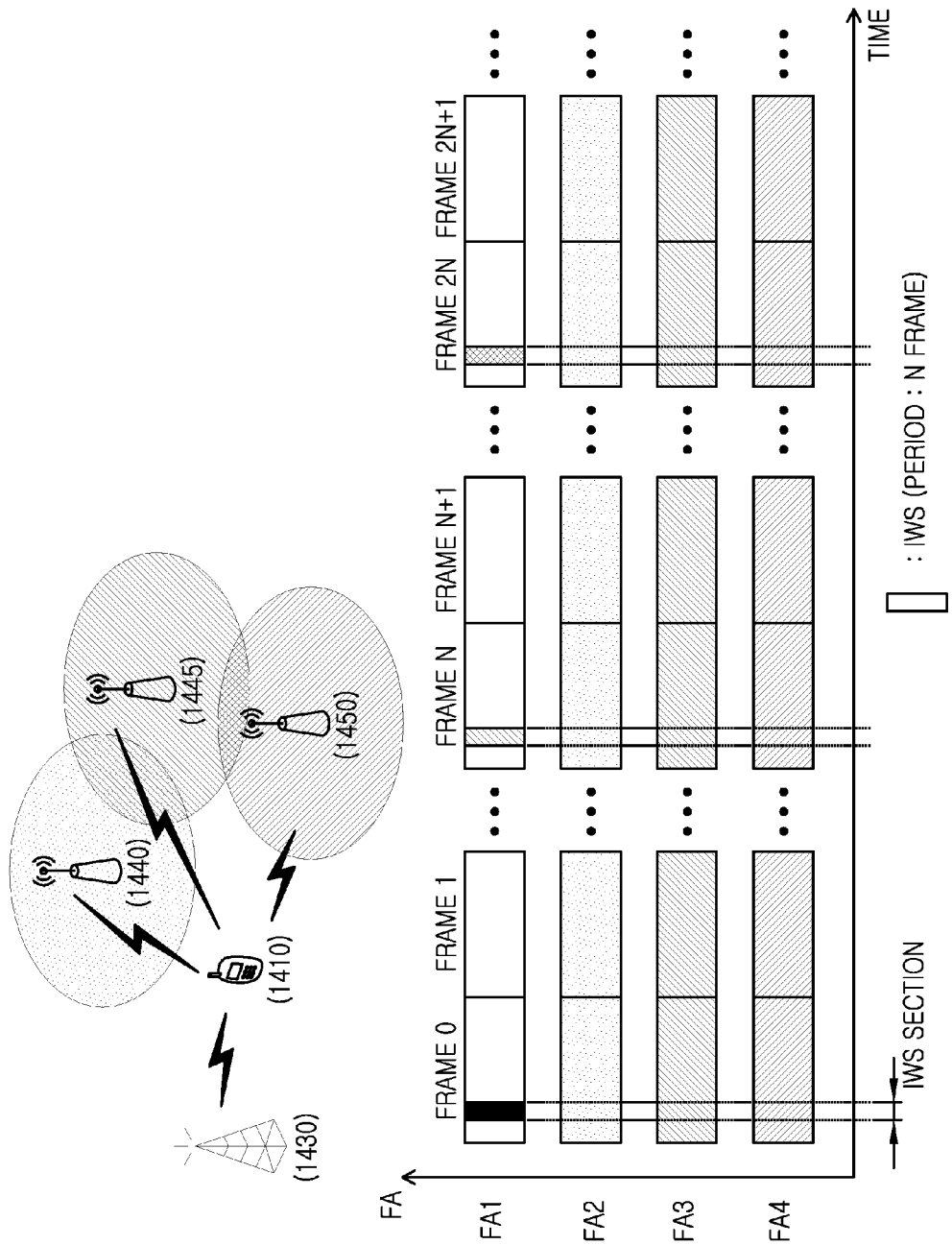
FIG. 14 is a view illustrating a handover state of a terminal under an environment where a macro cell and a femto cell are mixed according to an exemplary embodiment of the present invention.

FIG. 14 is a view illustrating a handover state of a terminal under an environment where a macro cell and a femto cell are mixed according to an exemplary embodiment of the present invention.

Referring to FIG. 14, a terminal 1410 performs data communication via FA1 allocated to a macro cell 1430, and performs data communication with contiguous femto cells 1440, 1445, and 1450 via FA2, FA3, and FA4, respectively.

The terminal 1410 measures an IWS of femto cells 1140, 1445, 1450 in order to measure signal quality of the femto cells 1140, 1445, 1450, and performs a handover to a relevant femto cell when needed.

Here, in the case where the terminal 1410 that supports a multiple carrier via a single RF chain requires IWS measurement in order to scan the femto cells 1140, 1445, 1450, the terminal 1410 changes to a double RF carrier mode.

In the case where the terminal 1410 performs a handover to a specific femto cell after scanning the femto cells 1140, 1445, 1450, the terminal 1410 operates in the double RF carrier mode.

Since a difference between received signal levels from the femto cells 1140, 1445, 1450, and the macro cell 1430 occurs depending on the position of the terminal 1410 inside the cell as illustrated in FIG. 7, the terminal 1410 tracks received signal levels of frequency channels of the femto cells 1140, 1445, 1450, and a frequency channel of the macro cell 1430 to determine whether to operate in a single RF carrier mode.

Figure 15:
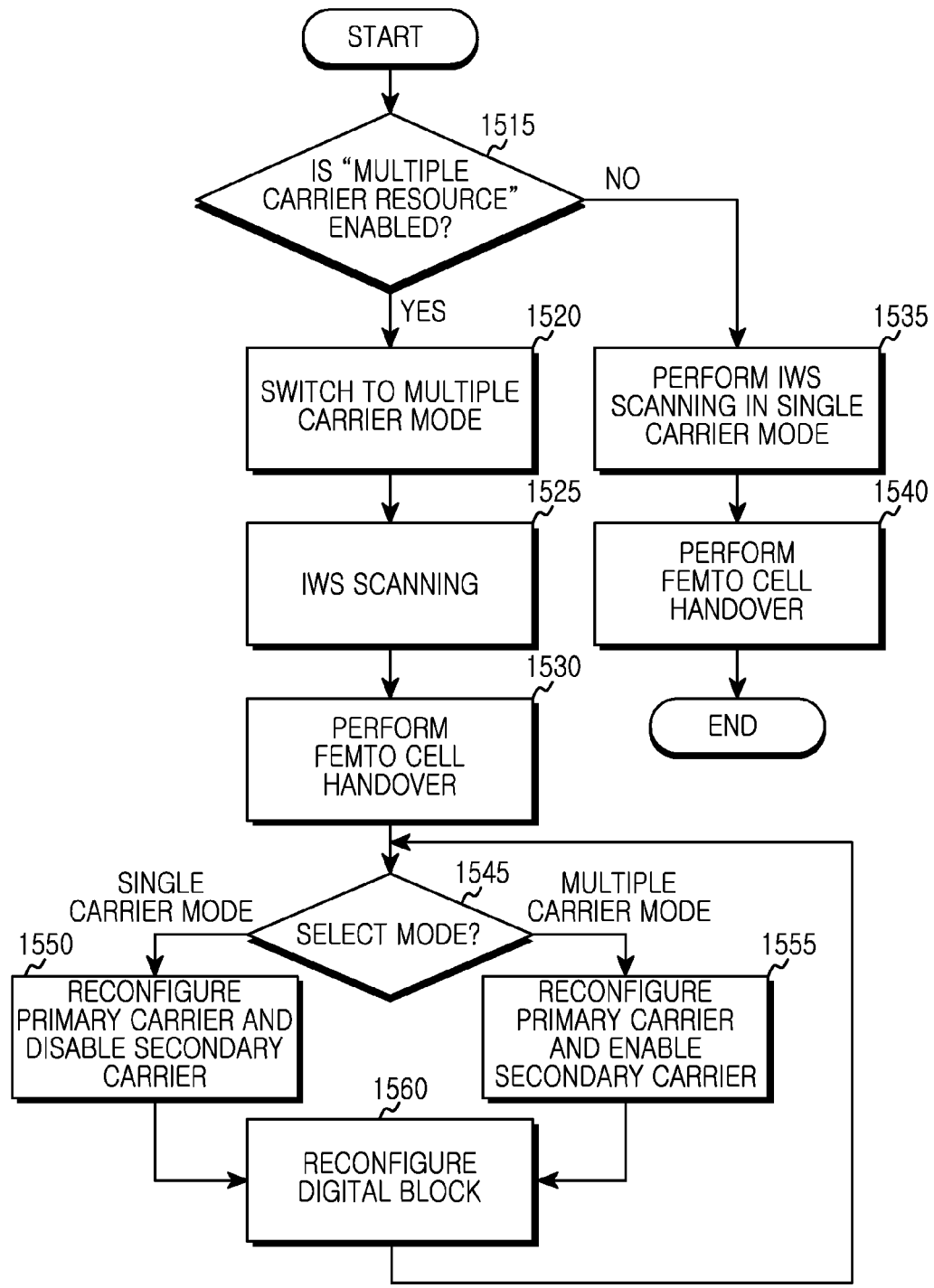
FIG. 15 is a flowchart illustrating a process for determining an operation mode of a terminal in the case where a terminal that supports a multiple carrier performs a handover to a femto cell according to an exemplary embodiment of the present invention.

FIG. 15 is a flowchart illustrating a process for determining an operation mode of a terminal in the case where a terminal that supports a multiple carrier performs a handover to a femto cell according to an exemplary embodiment of the present invention.

Referring to FIG. 15, in the case where a terminal supports a multiple carrier in a double RF chain structure, a current state is maintained. In the case where the terminal supports a multiple carrier in a single RF chain structure, IWS quality cannot be known, so that the terminal switches to a multiple carrier mode to scan IWS. In the case where the terminal performs a handover to a specific femto cell after scanning IWS, an operation mode is determined with reference to quality of a primary carrier signal and a secondary carrier signal.

In the case where the terminal supports a multiple carrier in the single RF chain structure (step 1515), a mode of the terminal is switched to a multiple carrier mode (step 1520). After that, IWS is scanned (step 1525). After that, when a handover is needed, the terminal performs a handover to a femto cell (step 1530).

After that, in the case where the primary carrier and the secondary carrier are contiguous frequency channels and a received signal of 2FA tracked by the AFE controller is a level receivable via a single RF chain, the terminal is set to a single carrier mode (step 1545).

In case of changing from a double carrier mode to a single carrier mode, a sub RF chain is disabled. In addition, a center frequency change of the primary RF chain, and operation mode changes of an ADC, an FFT, and a deallocator are performed (step 1550 and step 1560). Here, in case of the ADC, change of a clock corresponding to a bandwidth of 2FA is required. In case of the FFT, the size of the FFT should be controlled to operable for 2FA. In case of the deallocator, a secondary carrier received in 2FA is separated.

In the case where the primary carrier and the secondary carrier are contiguous frequency channels and a received signal of 2FA tracked by the AFE controller is not a level receivable via a single RF chain, the terminal is set to a double carrier mode (step 1545).

In case of changing from the single carrier mode to the double carrier mode, the sub RF chain is enabled. In addition, the center frequency change of the primary RF chain, and operation mode changes of the ADC, the FFT, and the deallocator are performed (step 1555 and step 1560). Here, in case of the ADC, change of a clock corresponding to a bandwidth of a frequency channel is required. In case of the FFT, the size of the FFT should be controlled to operable for 1FA. In case of the deallocator, a secondary carrier received in 1FA is separated.

In the case where the terminal cannot support a multiple carrier via a single RF chain structure (step 1515), IWS is scanned in the single carrier mode (step 1535). After that, when a handover is required, the terminal performs the handover to a femto cell (step 1540).

The present invention avoids quality deterioration of a signal and reduces power consumption by selectively using the multiple carrier mode and the single carrier mode depending on received signal quality and a service procedure in the case where the single RF chain supports the multiple carrier mode.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof

What is claimed is:

1. A method of a mobile station in a mobile communication system, the method comprising:
    measuring strength of a first signal corresponding to a first channel and strength of a second signal corresponding to a second channel, the first signal received through a first radio frequency (RF) chain and the second signal received through a second RF chain, respectively;
    determining that whether a difference between the strength of the first signal and the strength of the second signal is less than a threshold;
    if it is determined that the difference between the strength of the first signal and the strength of the second signal is less than the threshold, determining that the multiple frequency band reception is possible via the one of the first RF chain and the second RF chain; and
    receiving a signal corresponding to the first channel and a signal corresponding to the second channel through the one of the first RF chain and the second RF chain.

2. The method of claim 1, further comprising:
    if it is not determined that the difference between the strength of the first signal and the strength of the second signal is less than the threshold, determining that the multiple frequency band reception is not possible via the one of the first RF chain and the second RF chain; and
    receiving the signal corresponding to the first channel and a signal corresponding to the second channel through the first RF chain and the second RF chain, respectively.

3. The method of claim 1, further comprising:
    before measuring the strength of the first signal corresponding to the first channel and the strength of the second signal corresponding to the second channel, switching to a second mode from a first mode,
    wherein, in the first mode, the first signal and the second signal are received through the one of the first RF chain and the second RF chain, and
    wherein, in the second mode, the first signal and the second signal are received through the first RF chain and the second RF chain, respectively.

4. The method of claim 1, further comprising:
    before measuring the strength of the first signal corresponding to the first channel and the strength of the second signal corresponding to the second channel, receiving the first signal and the second signal through the first RF chain and the second RF chain.

5. The method of claim 1, further comprising:
    during a predefined period, switching to a second mode from a first mode,
    wherein, in the first mode, the first signal and the second signal are received through the one of the first RF chain and the second RF chain, and
    wherein, in the second mode, the first signal and the second signal are received through the first RF chain and the second RF chain, respectively.

6. The method of claim 1, wherein the first signal and the second signal comprise one of a signal on a primary carrier and a signal on a secondary carrier.

7. The method of claim 1, wherein the first signal and the second signal comprise one of a signal from a macro cell and a signal from a femto cell.

8. An apparatus of a mobile station in a mobile communication system, the apparatus comprising:
    a receiver including a first radio frequency (RF) chain and a second RF chain; and
    a controller configured to:
        measure strength of a first signal corresponding to a first channel and strength of a second signal corresponding to a second channel, the first signal received through the first RF chain and the second signal received through the second RF chain, respectively,
        determine that whether a difference between the strength of the first signal and the strength of the second signal is less than a threshold,
        if it is determined that the difference between the strength of the first signal and the strength of the second signal is less than the threshold, determine that the multiple frequency band reception is possible via the one of the first RF chain and the second RF chain, and
        control the receiver to receive a signal corresponding to the first channel and a signal corresponding to the second channel through the one of the first RF chain and the second RF chain.

9. The apparatus of claim 8, wherein the controller is configured to:
    if it is not determined that the difference between the strength of the first signal and the strength of the second signal is less than the threshold, determine that the multiple frequency band reception is not possible via the one of the first RF chain and the second RF chain,
    and control the receiver to receive the signal corresponding to the first channel and the signal corresponding to the second channel through the first RF chain and the second RF chain, respectively.

10. The apparatus of claim 8,
    wherein the controller is configured to:
        before measuring the strength of the first signal corresponding to the first channel and the strength of the second signal corresponding to the second channel, switch to a second mode from a first mode,
    wherein, in the first mode, the first signal and the second signal are received through the one of the first RF chain and the second RF chain, and
    wherein, in the second mode, the first signal and the second signal are received through the first RF chain and the second RF chain, respectively.

11. The apparatus of claim 8, wherein the controller is configured to:
    before measuring the strength of the first signal corresponding to the first channel and the strength of the second signal corresponding to the second channel, control the receiver to receive the first signal and the second signal through the first RF chain and the second RF chain.

12. The apparatus of claim 8, wherein the controller is configured to:
   during a predefined period, switch to a second mode from a first mode,
   wherein, in the first mode, the first signal and the second signal are received through the one of the first RF chain and the second RF chain, and
   wherein, in the second mode, the first signal and the second signal are received through the first RF chain and the second RF chain, respectively.

13. The apparatus of claim 8, wherein the first signal and the second signal comprise one of a signal on a primary carrier and a signal on a secondary carrier.

14. The apparatus of claim 8, wherein the first signal and the second signal comprise one of a signal from a macro cell and a signal from a femto cell.

* * * * *